(12) United States Patent
Marino et al.

(10) Patent No.: US 8,775,822 B2
(45) Date of Patent: Jul. 8, 2014

(54) COMPUTER-IMPLEMENTED METHOD AND SYSTEM FOR PROTECTING A SOFTWARE INSTALLATION AFTER CERTIFICATION

(75) Inventors: Michael G. Marino, Lombard, IL (US); Andres M. Torrubia, Alicante (ES)

(73) Assignee: Flexera Software, LLC, Schaumburg, IL (US)

( * ) Notice: Subject to any disclaimer, the term of this patent is extended or adjusted under 35 U.S.C. 154(b) by 1066 days.

(21) Appl. No.: 11/848,678

(22) Filed: Aug. 31, 2007

(65) Prior Publication Data

US 2009/0060174 A1    Mar. 5, 2009

(51) Int. Cl.
*G06F 12/14* (2006.01)

(52) U.S. Cl.
USPC .......................................................... 713/187

(58) Field of Classification Search
USPC ............ 713/164, 167, 187, 189, 191; 726/22, 726/26, 30; 725/25–31; 709/217–219
See application file for complete search history.

(56) References Cited

U.S. PATENT DOCUMENTS

| | | | |
|---|---|---|---|
| 5,892,904 A * | 4/1999 | Atkinson et al. ................. | 726/22 |
| 6,185,678 B1 | 2/2001 | Arbaugh et al. | |
| 6,430,608 B1 * | 8/2002 | Shaio ............................ | 709/217 |
| 6,611,925 B1 * | 8/2003 | Spear .......................... | 714/38.14 |
| 7,085,926 B1 * | 8/2006 | Peach ........................... | 713/160 |
| 7,107,618 B1 * | 9/2006 | Gordon et al. ................... | 726/24 |
| 7,210,168 B2 * | 4/2007 | Hursey et al. .................... | 726/24 |
| 7,584,261 B1 * | 9/2009 | Teodosiu et al. ................ | 709/217 |
| 7,653,647 B2 * | 1/2010 | Borthakur et al. ............. | 707/687 |
| 2001/0042171 A1 * | 11/2001 | Vermeulen ..................... | 711/118 |
| 2005/0039034 A1 * | 2/2005 | Doyle et al. ................... | 713/193 |
| 2005/0049790 A1 * | 3/2005 | Holman et al. .................. | 702/3 |
| 2005/0132350 A1 * | 6/2005 | Markley et al. ............... | 717/168 |
| 2005/0240921 A1 * | 10/2005 | Barker et al. ................. | 717/175 |
| 2007/0087756 A1 | 4/2007 | Hoffberg | |

FOREIGN PATENT DOCUMENTS

WO    WO 2008/074898    11/2008

* cited by examiner

*Primary Examiner* — Brandon Hoffman
(74) *Attorney, Agent, or Firm* — Michael A. Glenn; Perkins Coie LLP

(57) ABSTRACT

A computer-implemented system and method for protecting a software installation after certification are disclosed. The system includes components to determine if a cryptographic value of a digital content set matches with a stored cryptographic value of a validated digital content set, to determine if a cryptographic value of a validation rule set matches with a stored cryptographic value corresponding to a validation requirement, and to display a certification message if the cryptographic value of the digital content set matches with a stored cryptographic value of a validated digital content set and the cryptographic value of the validation rule set matches with a stored cryptographic value corresponding to a validation requirement.

12 Claims, 5 Drawing Sheets

COMPUTER-IMPLEMENTED METHOD AND SYSTEM FOR PROTECTING A SOFTWARE INSTALLATION AFTER CERTIFICATION

BACKGROUND

1. Technical Field

This disclosure relates to distribution of digital content. More particularly, the present disclosure relates to protecting a software installation after certification.

2. Related Art

The conventional Microsoft Windows Installer (previously known as the Microsoft Installer) is an engine for the installation, maintenance, and removal of software on Microsoft Windows computer systems. The installation information, and often the files themselves, are packaged in installation packages, loosely relational databases structured as OLE (Object Linking and Embedding) Structured Storage Files and commonly known as "MSI files", from their default file extension. The acronym MSI is derived from Microsoft Installation package.

During an installation process, the target system uses an executable file, sometimes called the bootstrap, to start the process of installing an MSI file. The bootstrap can facilitate the downloading and installing of the Windows Installer engine files. Then, the bootstrap can pass the necessary information to start the Windows Installer service and install an MSI package. The bootstrap may also contain the MSI files themselves, which can be extracted and run when the bootstrap is run. This allows the MSI and bootstrap to be carried together as a single file.

Typical computer system security procedures demand that some kind of validation be performed on the bootstrap and MSI files prior to installation. Un-validated installation files can damage a computer system on which they are installed. MSI validation rules are designed to prevent entries in the MSI database records that may be valid when examined individually, but that may cause incorrect behavior in the context of the entire MSI database.

It would be beneficial to be able to certify that MSI files meet certain pre-defined standards of validity. This is important because poorly created MSI files could affect the stability of a computer system and/or cause software conflicts with other software on the computer system. A certification process for MSI files could also be used to detect spyware, viruses, or other malware in an MSI package. Ideally, the MSI file certification could be performed by the software creator/publisher, without the need for a $3^{rd}$ party vendor. This process would allow the software creator/publisher to quickly fix any certification errors and release their products to the market much faster. This process would also allow the software creator/publisher to certify multiple versions of their product without having to constantly go back to a $3^{rd}$ party provider for verification/certification.

One problem with certifying an MSI file is that the MSI structure and process is an open standard. Anyone can open and edit an MSI database with freely available tools (e.g. Microsoft's Orca.exe). Thus, the MSI files and the related MSI certification rules used to validate those MSI files are vulnerable to unauthorized modification.

Thus, a computer-implemented system and method for protecting a software installation after certification are needed.

BRIEF DESCRIPTION OF THE DRAWINGS

Embodiments illustrated by way of example and not limitation in the figures of the accompanying drawings, in which.

DETAILED DESCRIPTION

A computer-implemented system and method for protecting a software installation after certification are disclosed. In the following description, numerous specific details are set forth. However, it is understood that embodiments may be practiced without these specific details. In other instances, well-known processes, structures and techniques have not been shown in detail in order not to obscure the clarity of this description.

Figure 1:
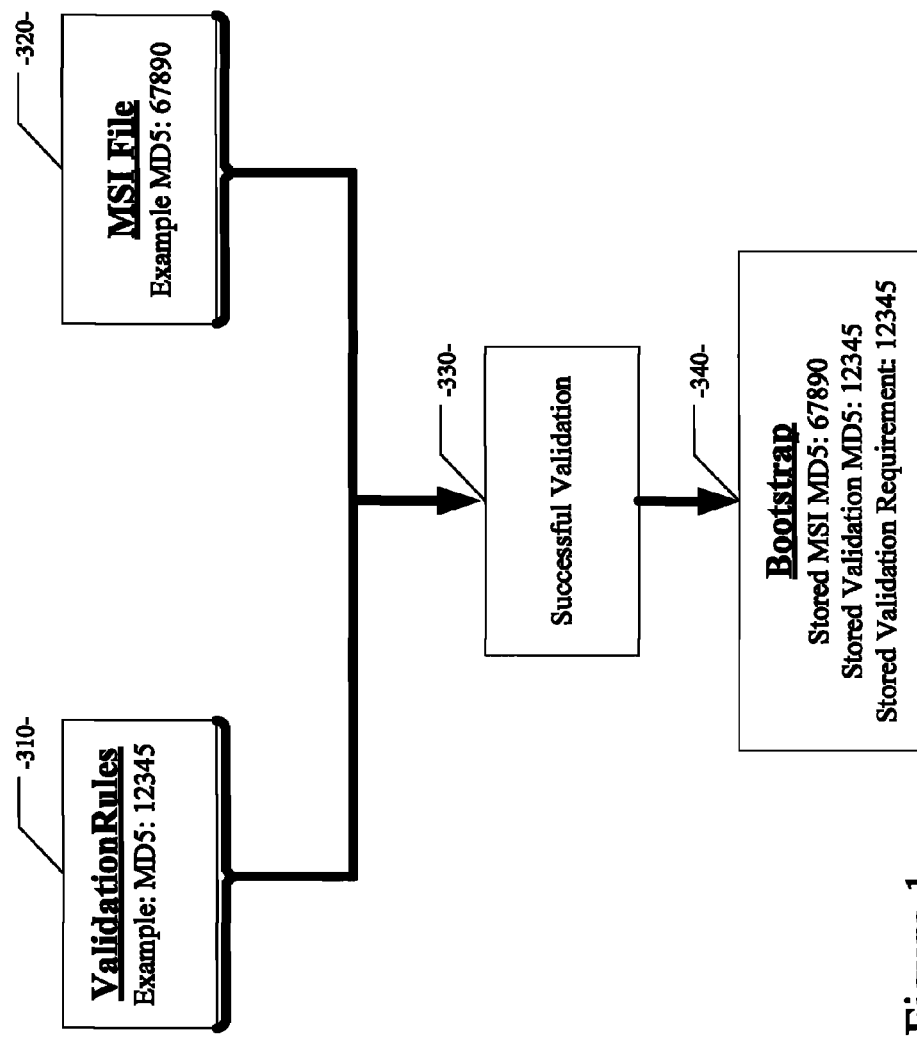
FIG. 1 illustrates an embodiment in which a software installation can be protected after certification.

When certifying a digital content set (e.g. MSI files), it is important to validate both the MSI files and the related MSI certification rules used to validate the MSI files. Otherwise, the certification of the digital content set may be compromised. FIG. 1 illustrates an embodiment in which a digital content set 320 is validated using a set of validation rules 310. If the validation rules 310 are run against the digital content set 320 and the validation rules 310 are successfully passed, a successful validation condition 330 can be signaled. In a particular embodiment, the validation process is augmented to add operations of creating cryptographic values for both the validation rule set 310 and the digital content set 320. In a particular embodiment, the cryptographic values can be MD5 values. In cryptography, MD5 (Message-Digest algorithm 5) is a widely used cryptographic hash function with a 128-bit hash value. As an Internet standard (RFC 1321), MD5 has been employed in a wide variety of security applications, and is also commonly used to check the integrity of files. An MD5 hash is typically expressed as a 32-character hexadecimal number. In a particular embodiment, the validation process is augmented to add operations of creating MD5 hash values for both the validation rule set 310 and the digital content set 320. As shown in FIG. 1, a sample MD5 value of 12345 is created for the validation rule set 310 and a sample MD5 value of 67890 is created for the digital content set 320. It will be apparent to those of ordinary skill in the art that these cryptographic values can be created in any of a variety of well-known ways. Once these cryptographic values are created for both the validation rule set 310 and the digital content set 320, the validation rules 310 can be run against the digital content set 320. If the successful validation state 330 is entered, the cryptographic values created for both the validation rule set 310 and the digital content set 320 are stored in bootstrap 340. In a particular embodiment, the cryptographic values are encrypted into bootstrap 340. As described above, the bootstrap 340 can facilitate the downloading and installing of the Windows Installer engine files. Then, the bootstrap 340 can pass the necessary information to start the Windows Installer service and install an MSI package. The bootstrap 340 may also contain the MSI files themselves, which can be extracted and run when the bootstrap is run. As part of the particular embodiment described herein, the bootstrap can also store (or have encrypted therein) the cryptographic values created for both the validation rule set 310 and the digital content set 320. In addition, a validation requirement value can also be stored (or encrypted into) the bootstrap 340.

As shown in FIG. 1, the bootstrap 340 can store (or have encrypted therein) the stored MSI MD5 value, the stored validation MD5 value, and the stored validation requirement value. The stored MSI MD5 value represents the cryptographic value of the digital content set 320 against which the validation rules 310 were run. The stored validation MD5 value represents the cryptographic value of the validation rules 310 run against the digital content set 320. The stored validation requirement value is used to tie the bootstrap 340 to a particular validation rule set 310. Tying the bootstrap 340 to a particular validation rule set 310 prevents users from modifying an issued rule set without affecting the execution of the bootstrap 340.

When the bootstrap 340 is executed, the bootstrap 430 can first compare the cryptographic value of the digital content set with the stored MSI MD5 value of the digital content set 320 against which the validation rules 310 were run. Next, the bootstrap 340 can compare the cryptographic value of the validation rules 310 with the stored validation requirement value. If both of these comparisons succeed, the digital content set 320 can be certified and a certification message or logo can be displayed. Note that the certification or validation logo and/or message can be encrypted to protect this information from unauthorized use.

Figure 2:
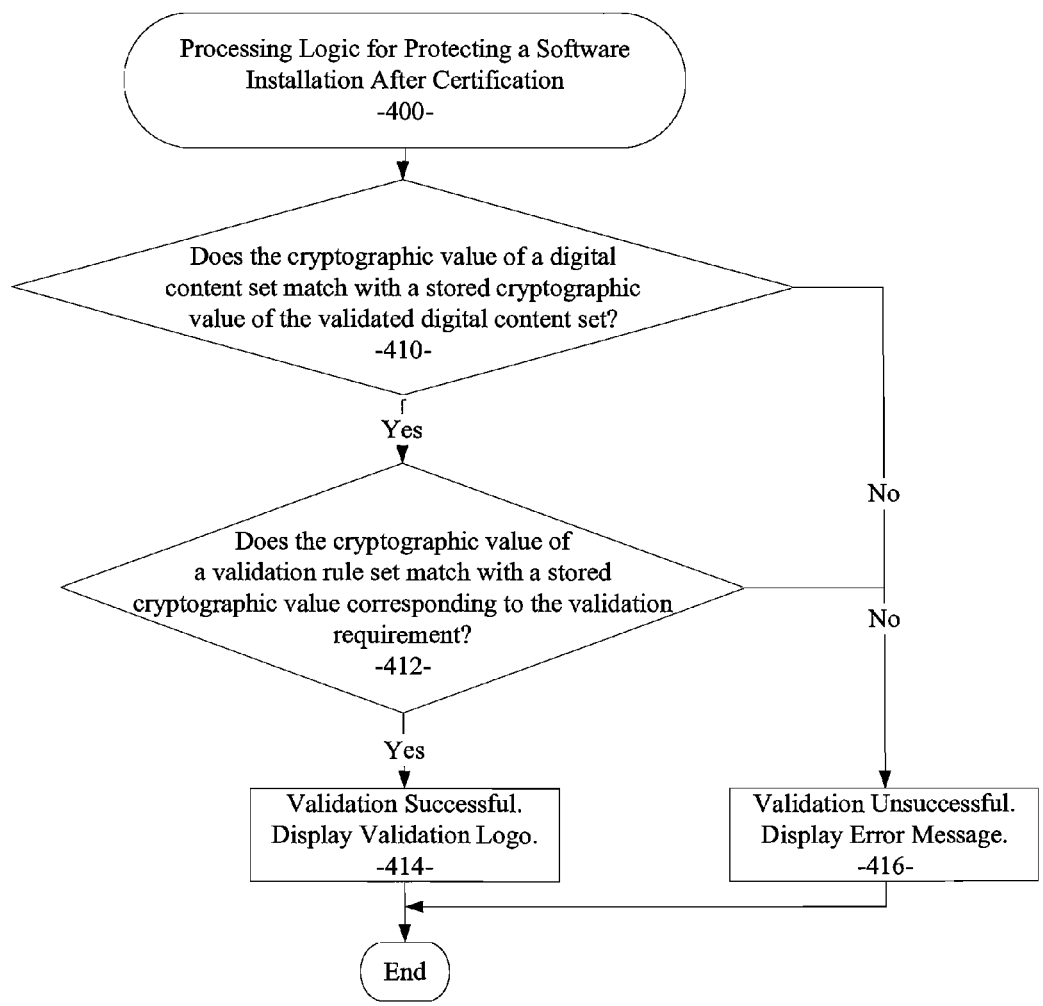
FIGS. 2-4 illustrates flow diagrams showing the basic processing operations performed in various embodiments.

Referring to FIG. 2, a flow diagram illustrates the processing flow in a particular embodiment. In decision block 410, the cryptographic value of a digital content set is compared with a stored cryptographic value of the validated digital content set. If this comparison succeeds, the cryptographic value of a validation rule set is compared with a stored cryptographic value corresponding to the validation requirement (decision block 412). If this comparison succeeds, the validation is successful and a certification logo can be displayed (processing block 414). If this comparison fails, the validation is unsuccessful and an error or status message can be displayed (processing block 416).

In one embodiment, the validated bootstrap 340 and the digital content set 320 are digitally signed to prevent tampering or modification of the bootstrap 340 and the digital content set 320. The use of digital signatures is well know in the art. In this embodiment, the bootstrap 340 will determine whether or not the digital content set 320 has been digitally signed and will present a warning message if the digital content set 320 has not been digitally signed or encrypted. This particular embodiment is illustrated in FIG. 3.

Figure 3:
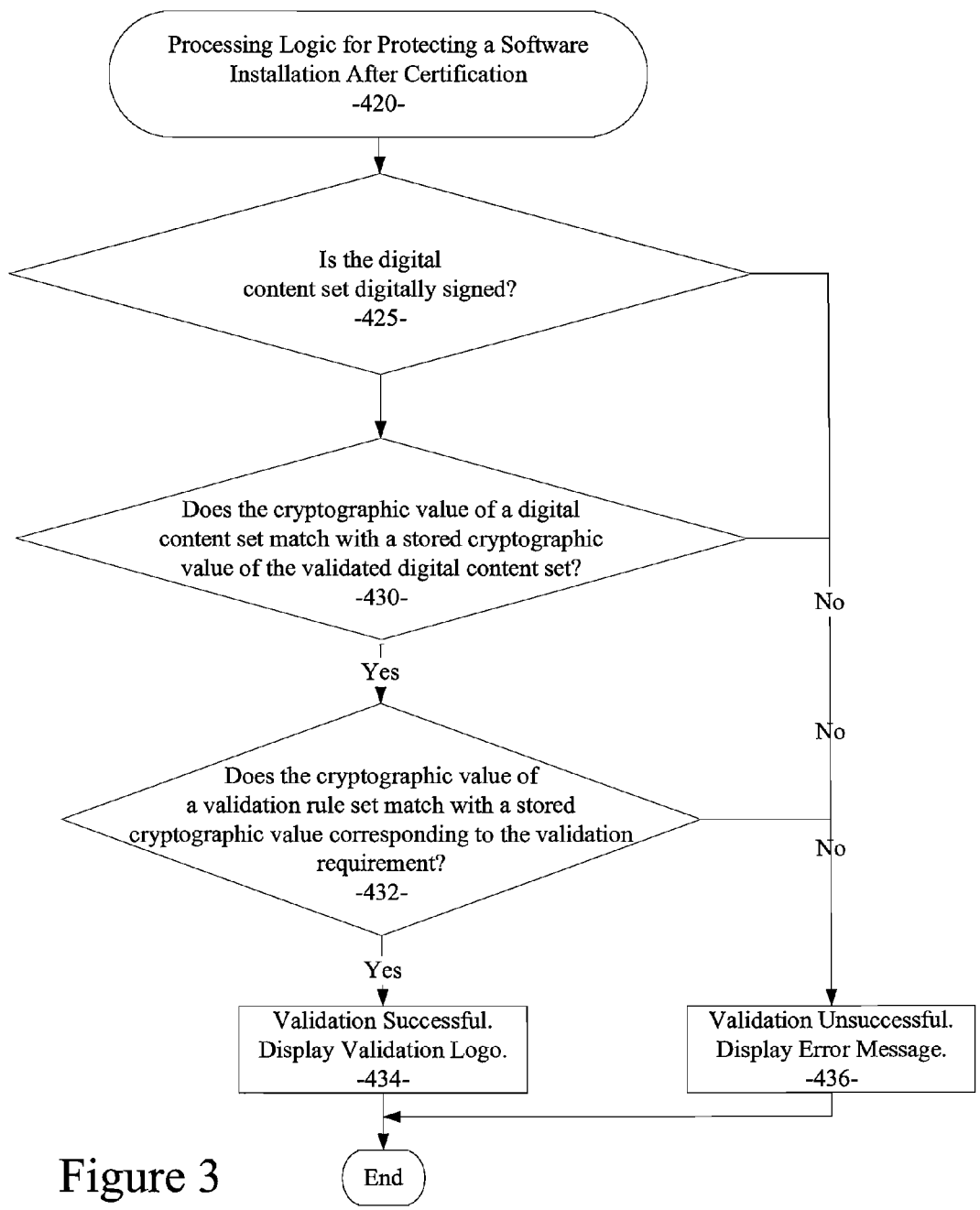

Referring to FIG. 3, a flow diagram illustrates the processing flow in a particular embodiment. The processing logic for protecting a software installation after certification starts in block 420. In decision block 425, the bootstrap 340 determines if the digital content set is digitally signed. If the digital content set is digitally signed, processing continues at decision block 430. In decision block 430, the cryptographic value of a digital content set is compared with a stored cryptographic value of the validated digital content set. If this comparison succeeds, the cryptographic value of a validation rule set is compared with a stored cryptographic value corresponding to the validation requirement (decision, block 432). If this comparison succeeds, the validation is successful and a certification logo can be displayed (processing block 434). If this comparison fails, the validation is unsuccessful and an error or status message can be displayed (processing block 446).

As described above, the validation procedure may be implemented either during the bootstrap code execution or within the Windows Installer itself. The Windows Installer is a component that is typically bundled within the Windows Operating System. In another alternative embodiment, the validation logic associated with the validation rules 310 is performed by the Windows Installer program and not by the bootstrap code 340. In this embodiment, the cryptographic value (e.g. MD5 value) of the digital content set 320 against which the validation rules 310 were run and the cryptographic value of the validation rules that were used to validate the digital content set 320 are stored in an additional MSI certification table. The MSI certification table is accessible to the Windows Installer program.

When the digital content files 320 are about to be installed by the Windows Installer program, the Windows Installer program determines if the MSI certification table is present. If the MSI certification table is present, the Windows Installer computes a cryptographic value for the digital content set to be installed, excluding the certification table from the cryptographic value computation. Then the Windows Installer extracts the cryptographic value (e.g. MD5 value) of the digital content set 320 against which the validation rules 310 were run and compares this cryptographic value with the cryptographic value of the digital content set 320 to be installed. If this comparison succeeds, the Windows Installer then extracts the cryptographic value of the validation rules that were used to validate the digital content set 320. This cryptographic value of the validation rules is compared with a known (by the Windows Installer) validation requirement cryptographic value. If this comparison succeeds, the Windows Installer can display a certification logo for the validated installation. This particular embodiment is illustrated in FIG. 4.

Figure 4:
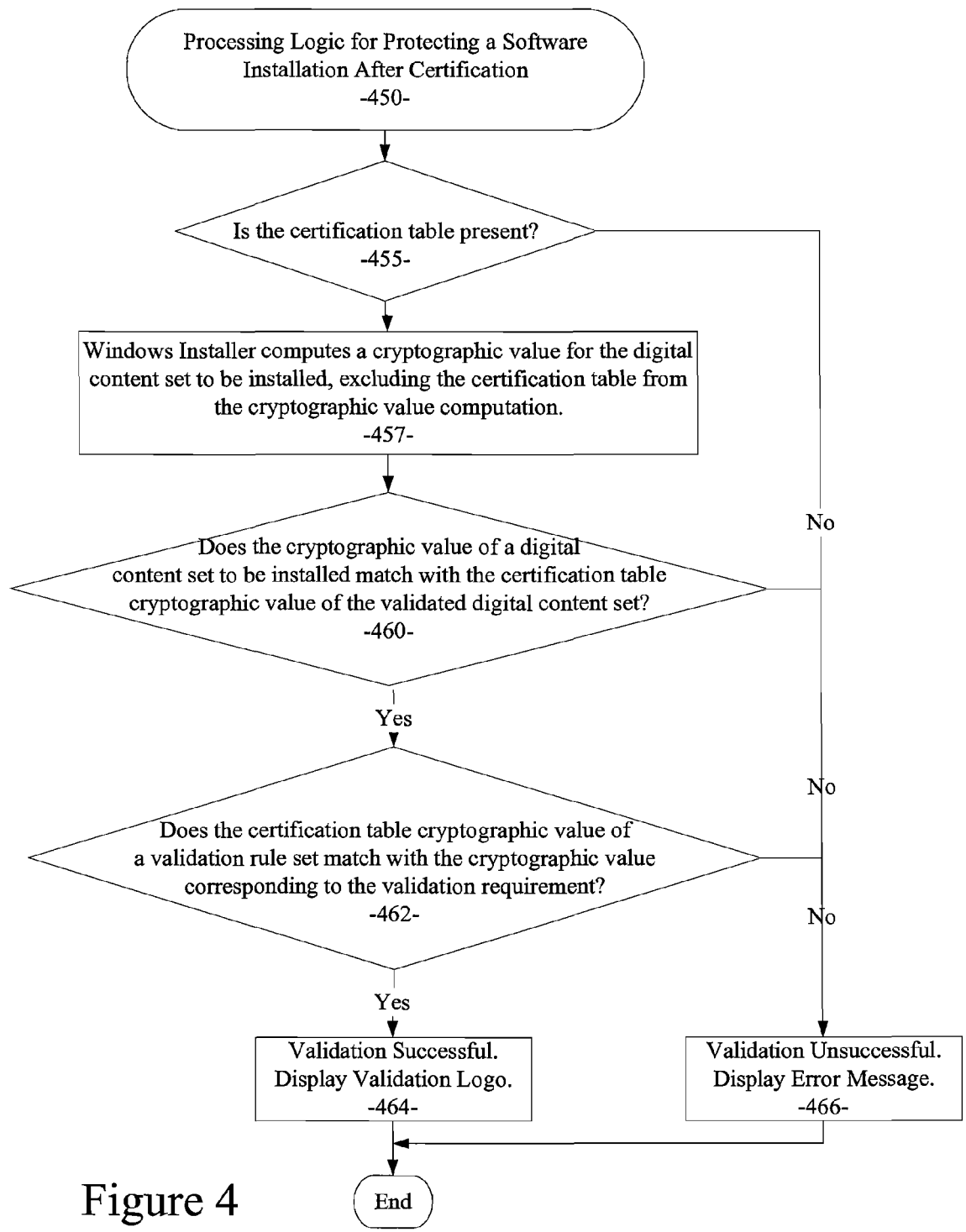

Referring to FIG. 4, a flow diagram illustrates the processing flow in a particular embodiment. The processing logic for protecting a software installation after certification starts in block 450. In decision block 455, the Windows Installer determines if the certification table is present. If the certification table is present, the Windows Installer computes a cryptographic value for the digital content set to be installed, excluding the certification table from the cryptographic value computation (processing block 457). Next, the Windows Installer determines if the cryptographic value of a digital content set to be installed match with the certification table cryptographic value of the validated digital content set (decision block 460). If there is a match, the Windows Installer determines if the certification table cryptographic value of a validation rule set match with the cryptographic value corresponding to the validation requirement (decision block 462). If this comparison succeeds, the validation is successful and a certification logo can be displayed (processing block 464). If this comparison fails, the validation is unsuccessful and an error or status message can be displayed (processing block 466).

Figure 5:
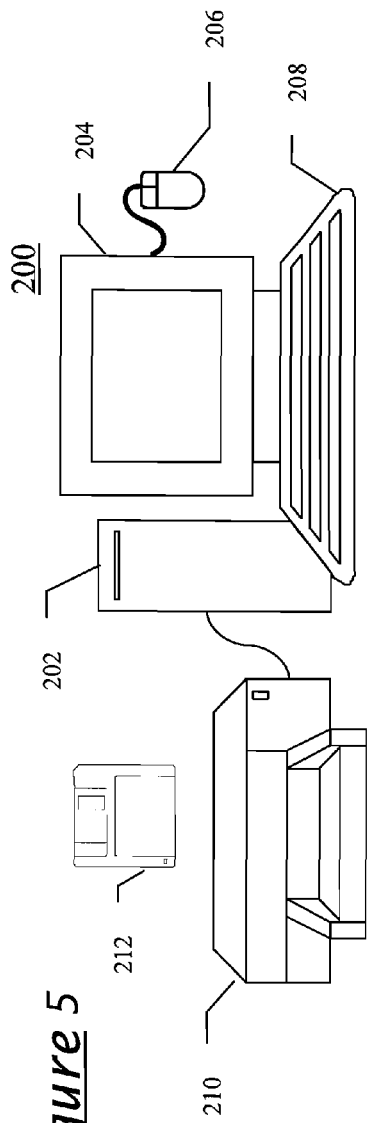
FIGS. 5 and 6 are block diagrams of a computing system on which an embodiment may operate and in which embodiments may reside.
Figure 6:
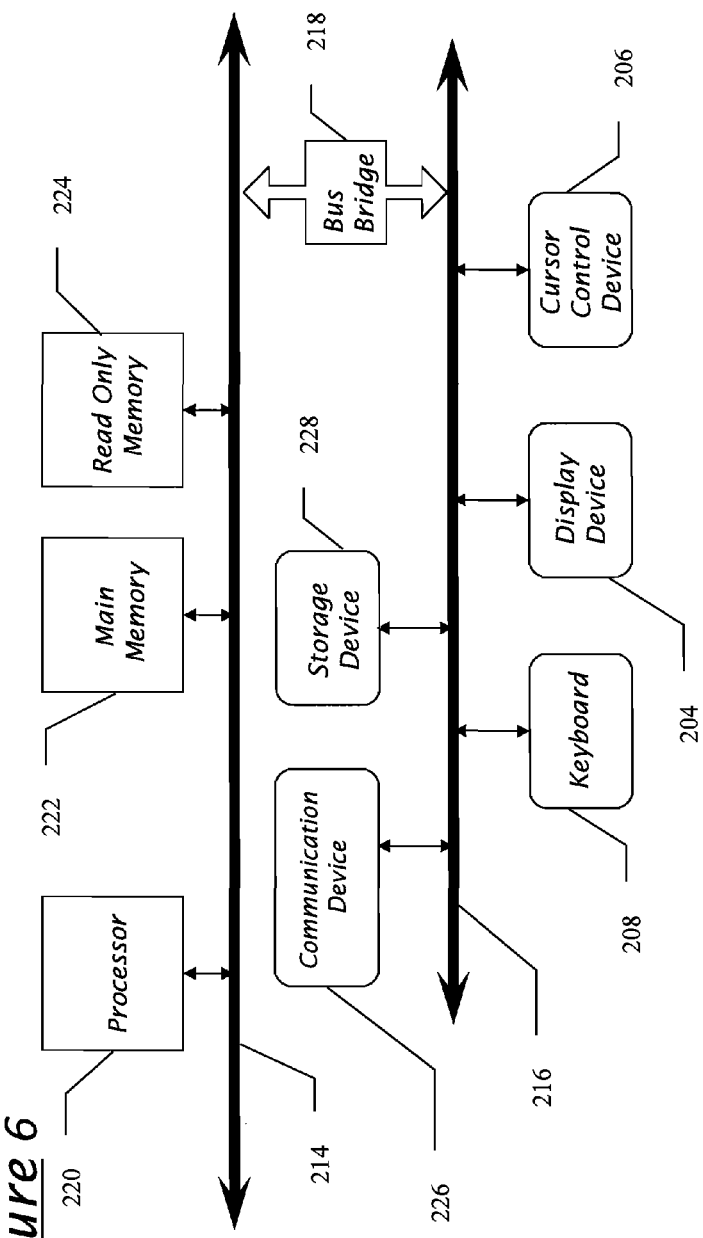

FIGS. 5 and 6 show an example of a computer system 200 illustrating an exemplary client or server computer system in which the features of an example embodiment may be implemented. Computer system 200 is comprised of a bus or other communications means 214, 216 and 218 for communicating information, and a processing means such as processor 220 coupled with bus 214 for processing information. Computer system 200 further comprises a random access memory (RAM) or other dynamic storage device 222 (commonly referred to as main memory), coupled to bus 214 for storing information and instructions to be executed by processor 220. Main memory 222 also may be used for storing temporary variables or other intermediate information during execution of instructions by processor 220. Computer system 200 also comprises a read only memory (ROM) and/or other static storage device 224 coupled to bus 214 for storing static information and instructions for processor 220.

An optional data storage device 228 such as a magnetic disk or optical disk and its corresponding drive may also be coupled to computer system 200 for storing information and instructions. Computer system 200 can also be coupled via bus 216 to a display device 204, such as a cathode ray tube (CRT) or a liquid crystal display (LCD), for displaying information to a computer user. For example, image, textual, video, or graphical depictions of information may be presented to the user on display device 204. Typically, an alphanumeric input device 208, including alphanumeric and other keys is coupled to bus 216 for communicating information and/or command selections to processor 220. Another type of user input device is cursor control device 206, such as a conventional mouse, trackball, or other type of cursor direction keys for communicating direction information and command selection to processor 220 and for controlling cursor movement on display 204.

A communication device 226 may also be coupled to bus 216 for accessing remote computers or servers, such as a web server, or other servers via the Internet, for example. The communication device 226 may include a modem, a network interface card, or other well-known interface devices, such as those used for interfacing with Ethernet, Token-ring, wireless, or other types of networks. In any event, in this manner, the computer system 200 may be coupled to a number of servers via a conventional network infrastructure.

The system of an example embodiment includes software, information processing hardware, and various processing steps, as described above. The features and process steps of example embodiments may be embodied in machine or computer executable instructions. The instructions can be used to cause a general purpose or special purpose processor, which is programmed with the instructions to perform the steps of an example embodiment. Alternatively, the features or steps may be performed by specific hardware components that contain hard-wired logic for performing the steps, or by any combination of programmed computer components and custom hardware components. While embodiments are described with reference to the Internet, the method and apparatus described herein is equally applicable to other network infrastructures or other data communications systems.

It should be noted that the methods described herein do not have to be executed in the order described, or in any particular order. Moreover, various activities described with respect to the methods identified herein can be executed in repetitive, simultaneous, recursive, serial, or parallel fashion. Information, including parameters, commands, operands, and other data, can be sent and received in the form of one or more carrier waves through communication device 226.

Upon reading and comprehending the content of this disclosure, one of ordinary skill in the art will understand the manner in which a software program can be launched from a computer-readable medium in a computer-based system to execute the functions defined in the software program described above. One of ordinary skill in the art will further understand the various programming languages that may be employed to create one or more software programs designed to implement and perform the methods disclosed herein. The programs may be structured in an object-orientated format using an object-oriented language such as Java, Smalltalk, or C++. Alternatively, the programs can be structured in a procedure-orientated format using a procedural language, such as assembly or C. The software components may communicate using any of a number of mechanisms well known to those of ordinary skill in the art, such as application program interfaces or inter-process communication techniques, including remote procedure calls. The teachings of various embodiments are not limited to any particular programming language or environment, including HTML and XML.

Thus, other embodiments may be realized. For example, FIGS. 5 and 6 illustrate block diagrams of an article of manufacture according to various embodiments, such as a computer 200, a memory system 222, 224, and 228, a magnetic or optical disk 212, some other storage device 228, and/or any type of electronic device or system. The article 200 may include a computer 202 (having one or more processors) coupled to a computer-readable medium 212, a printer 210, and/or a storage device 228 (e.g., fixed and/or removable storage media, including tangible memory having electrical, optical, or electromagnetic conductors) or a carrier wave through communication device 226, having associated information (e.g., computer program instructions and/or data), which when executed by the computer 202, causes the computer 202 to perform the methods described herein.

Various embodiments are described. In particular, the use of embodiments with various types and formats of user interface presentations may be described. It will be apparent to those of ordinary skill in the art that alternative embodiments of the implementations described herein can be employed and still fall within the scope of the claims set forth below. In the detail herein, various embodiments are described as implemented in computer-implemented processing logic denoted sometimes herein as the "Software". As described above, however, the claimed invention is not limited to a purely software implementation.

Thus, a computer-implemented system and method for protecting a software installation after certification are disclosed. While the present invention has been described in terms of several example embodiments, those of ordinary skill in the art will recognize that the present invention is not limited to the embodiments described, but can be practiced with modification and alteration within the spirit and scope of the appended claims. The description herein is thus to be regarded as illustrative instead of limiting.

We claim:

1. A computer-implemented method comprising:

receiving an initial digital content set corresponding to a software installation;

receiving a validation rule set configured to validate said initial digital content set;

running the validation rule set against the initial digital content set to create a validated digital content set when the validation is successful;

creating a first cryptographic value for said validation rule set used to validate said initial digital set for said software installation;

creating a second cryptographic values for the validated digital content set against which the validation rule set was run;

if running the validation rule set against the initial data set was successful, storing the first cryptographic value of the validation rule set and the second cryptographic value of the validated digital content set against which the validation rule set was run;

comparing a cryptographic values of a new digital content set to be installed in a new software installation with the stored second cryptographic value of the validated digital content set against which the validation rule set was run;

comparing a cryptographic value of a new validation rule set configured to validate said new digital content set to be installed with the stored first cryptographic value of the validation rule set used to validate the initial digital content set; and displaying a certification message for said new software installation if the cryptographic value of the new digital content set match with the stored second cryptographic value of the validated digital content set against which the validation rules set was run and the cryptographic value of the new validation rule set match with the stored first cryptographic value of the validation rule set used to validate the initial digital content set.

2. The computer-implemented method as claimed in claim 1 wherein the new digital content set is digitally signed.

3. The computer-implemented method as claimed in claim 1 wherein the cryptographic values are each MD5 values.

4. The computer-implemented method as claimed in claim 1 wherein the certification message is a certification logo.

5. A non-transitory computer-readable medium having stored thereon a plurality of instructions, the plurality of instructions when executed by a computer, causing the computer to perform:
   running the validation rule set against the initial digital content set to create a validated digital content set when the validation is successful;
   creating a first cryptographic value for said validation rule set used to validate said initial digital set for said software installation;
   creating a second cryptographic value for the validated digital content set against which the validation rule set was run;
   if running the validation rule set against the initial data set was successful, storing the first cryptographic value of the validation rule set and the second cryptographic value of the validated digital content set against which the validation rule set was run;
   comparing a cryptographic value of a new digital content set to be installed in a new software installation with the stored second cryptographic value of the validated digital content set against which the validation rule set was run;
   comparing a cryptographic value of a new validation rule set configured to validate said new digital content set to be installed with the stored first cryptographic value of the validation rule set used to validate the initial digital content set; and
   displaying a certification message for said new software installation if the cryptographic value of the new digital content set match with the stored second cryptographic value of the validated digital content set against which the validation rules set was run and the cryptographic value of the new validation rule set match with the stored first cryptographic value of the validation rule set used to validate the initial digital content set.

6. The non-transitory computer-readable medium of claim 5 wherein the new digital content set is digitally signed.

7. The non-transitory computer-readable medium of claim 5 wherein the cryptographic values are each MD5 values.

8. The non-transitory computer-readable medium of claim 5 wherein the certification message is a certification logo.

9. A computer-implemented method comprising:
   receiving an initial digital content set corresponding to a software installation;
   receiving a validation rule set configured to validate said initial digital content set;
   running the validation rule set against the initial digital content set to create a validated digital content set when the validation is successful;
   creating a first cryptographic value for said validation rule set used to validate said initial digital set for said software installation;
   creating a second cryptographic value for the validated digital content set against which the validation rule set was run;
   if running the validation rule set against the initial data set was successful, storing in a certification table the first cryptographic value of the validation rule set and the second cryptographic value of the validated digital content set against which the validation rule set was run;
   determining if said certification table is present and, when present, perform:
      comparing a cryptographic values of a new digital content set to be installed in a new software installation with the stored second cryptographic value of the validated digital content set against which the validation rule set was run;
      comparing a cryptographic values of a new validation rule set configured to validate said new digital content set to be installed with the stored first cryptographic value of the validation rule set used to validate the initial digital content set; and
      displaying a certification message for said new software installation if the cryptographic value of the new digital content set match with the stored second cryptographic value of the validated digital content set against which the validation rules set was run and the cryptographic value of the new validation rule set match with the stored first cryptographic value of the validation rule set used to validate the initial digital content set.

10. The computer-implemented method as claimed in claim 9 wherein the new digital content set is digitally signed.

11. The computer-implemented method as claimed in claim 9 wherein the cryptographic values are each MD5 values.

12. The computer-implemented method as claimed in claim 9 wherein the certification message is a certification logo.

* * * * *